United States Patent Office 3,468,134
Patented Sept. 23, 1969

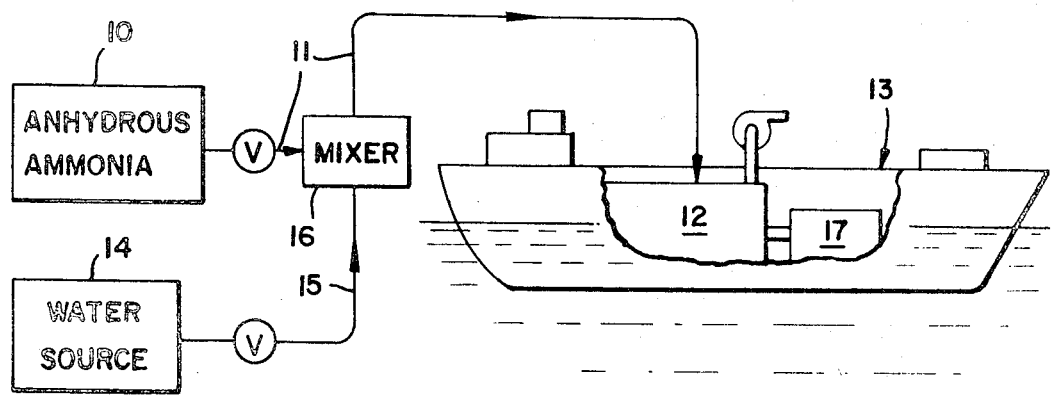
FIG_1
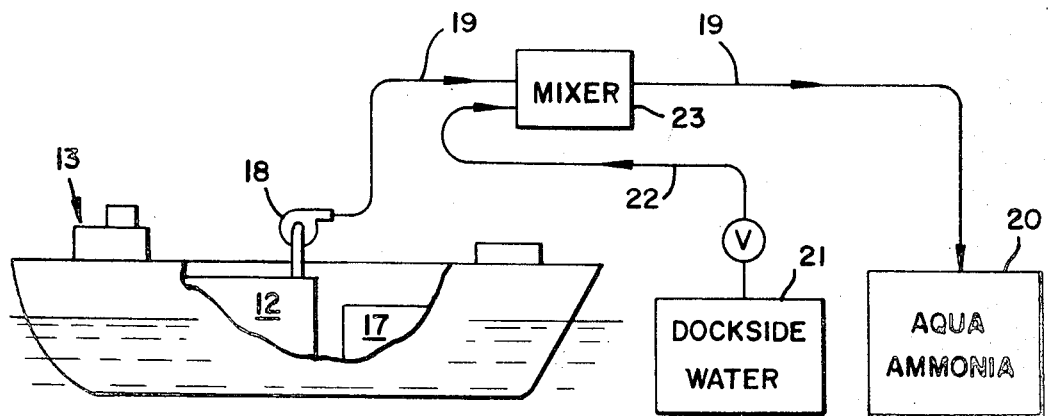
FIG_2

3,468,134
TWO-STAGE METHOD OF CONVERTING ANHYDROUS TO AQUA AMMONIA
Jonathan Garst, 676 Santa Barbara Road, Berkeley, Calif. 94707
Filed Aug. 4, 1967, Ser. No. 658,535
Int. Cl. F17c 11/00
U.S. Cl. 62—48                    3 Claims

ABSTRACT OF THE DISCLOSURE

The method of adding a relatively small amount of water to anhydrous ammonia to form an initial ammonia-water solution which is refrigerated to hold the solution in liquid form at atmospheric pressure, the initial solution being then transported to a desired destination and there unloaded directly and without external cooling into a non-refrigerated and unpressurized container with sufficient water at ambient temperature being mixed with the initial solution as it is unloaded to produce aqua ammonia having a desired nitrogen content, and in which the initial solution absorbs sufficient of the heat of solution generated by the subsequent addition of water so that the vapor pressure of the resultant aqua ammonia is maintained below one atmosphere.

Background of the invention

Technological advances in the manufacture of ammonia have resulted in the erection of very large production units, in most cases near a source supply of natural gas. The median size of the plants built up to 1966 was about 100,000 tons of ammonia per year. The median size of the plants under construction or planned since 1966 is 330,000 tons per year, or approximately 1000 tons of ammonia a day. The total rated production capacity of ammonia plants in the United States in 1966 was 12,524,000 tons. The plants presently under construction or planned will provide an additional 8,117,000 tons per year.

The chief use for this ammonia is as fertilizer. Ammonia is a gas at normal temperature, and in order to store it at normal temperature in liquid form it must be confined in containers which can stand a test pressure of 265 p.s.i. Otherwise, if it is desired to store anhydrous ammonia in liquid form at atmospheric pressure it must be refrigerated to about —28 degrees F. Much of this ammonia is made into solid fertilizer by reacting it with an acid to produce such products as ammonium sulphate, and ammonium nitrate or urea. This is an expensive process and because the value of these fertilizers is rated primarily on the quantity of nitrogen they contain, little additional value except convenience in handling is added to the product, while the concentration of nitrogen is reduced from 82 percent in anhydrous ammonia (the starting point) to 21, 33 and 46 percent nitrogen, respectively, in fertilizer grade ammonium sulphate, ammonium nitrate and urea.

In order to avoid the expense of manufacturing solid salts, methods have been devised for introducing anhydrous ammonia gas directly into the soil. These methods require high-pressure storage and equipment with safety devices and skilled labor. More and more aqua ammonia containing 20–25 percent N has been used for field application. The 20 percent N aqua ammonia which is standard in many locales, has a distinct advantage in that it has a vapor pressure of one atmosphere at about 110 degrees F. Thus, it can be stored in liquid form in inexpensive non-pressure tanks even in hot climates.

With the greatly increased production capacity for ammonia, transportation thereof has become a real problem. Most of the large ammonia plants are on the gulf coast near natural gas wells. The cheapest way for ammonia to be transported to the fields in the Middle West for fertilizer purposes is as anhydrous ammonia in refrigerated barges up the Mississippi River, since anhydrous ammonia contains 82⅓% N, whereas solid salts range from 21 to 46% N and standard aqua ammonia has only 20% N.

The large-capacity ammonia plants can also quickly accumulate a load for ocean-going refrigerated tankers, and considerable amounts of ammonia have been so shipped in anhydrous form, refrigerated to —28° F. Liquid petroleum gas (L.P.G.) tankers which have been widely used, can refrigerate their cargo to around —50° F., and such tankers are readily suitable for shipments of anhydrous ammonia, although they have not been so used since the extra amount of refrigeration is not needed for shipment of anhydrous ammonia.

Although shipment of anhydrous ammonia by refrigerated barges and tankers is commonly practiced, the unloading of such barges and tankers is an expensive procedure. So far, shipments have been made only to shore stations where there are facilities for the storage of liquid anhydrous ammonia, either in pressure tanks tested to 25 p.s.i. or in non-pressure tanks refrigerated to —28° F. Such facilities are, however, very expensive to build and maintain, and the demand for their use is seasonal at best.

By far the cheapest way to store ammonia is as 20% N aqua ammonia, since this may be stored in relatively inexpensive, non-pressurized and unrefrigerated tanks. In addition, since aqua ammonia is replacing anhydrous ammonia in field use, storage of ammonia in aqua form is advantageous because this is the form in which it will be used.

At present, however, there is no method used whereby anhydrous ammonia can be quickly and economically unloaded from a refrigerated vessel and converted into 20% N aqua ammonia for storage purposes. The formation of aqua ammonia from dissolving anhydrous ammonia into water occurs readily, but it involves one big problem—the dissipation of the heat of formation and solution. If anhydrous ammonia is introduced without loss of heat into the proper amount of water to make 20% N aqua ammonia, the temperature of the solution will be raised 78° F. above the starting temperature. Since the water usually available for use generally ranges from about 50 to 80° F., the heat of solution will raise the temperature of the aqua ammonia well above that at which the vapor pressure of the solution is one atmosphere. As a consequence, some manner of rapid cooling of the solution must be employed to maintain the temperature of the aqua ammonia below its boiling point. Again, this requires expensive refrigerating equipment at the shore installation and at best the conversion process is quite slow. The rapidity of unloading is, of course an important factor because the expense involved in having a large tanker tied up at a dock for a long period of unloading time is considerable.

Summary of the invention

I have discovered a way in which ammonia can be transported in refrigerated vessels and in which such ammonia can be unloaded and converted into 20% N aqua ammonia at full pumping speed directly from the barge or tanker into an unrefrigerated and non-pressurized storage tank without the necessity for any external refrigeration.

In general, this is accomplished by adding a relatively small amount of water to the anhydrous ammonia as it is loaded initially into the refrigerated vessel. The solution is then transported to the desired destination. When the vessel reaches port, all that is necessary is to connect a line from the dockside water source to the line from the vessel to the non-pressurized and unrefrigerated storage tank. The ammonia solution can then be pumped by the pump on the vessel, at full pumping speed, directly from the vessel to the storage tank wherein it is stored at 20% N aqua ammonia.

The refrigerated solution carried by the vessel, by virtue of the initial addition of water, absorbs the heat of solution and formation caused by the addition of the water during unloading, and thus maintains the 20% N aqua ammonia at a temperature wherein the vapor pressure of the aqua ammonia is less than one atmosphere.

The amount of water needed to be added initially will vary in accordance with the temperature of the water available at dockside for unloading, the temperature to which the vessel refrigerates its cargo and the desired percentage of nitrogen in the final aqua ammonia. This matter will be discussed at greater length in the following detailed description. However, the amount of water needed to be added initially is surprisingly small and thus there is but little reduction of the nitrogen in the cargo. Furthermore, ammonia and water dissolve into each other such that when two volumes of ammonia and water are mixed together the resultant volume is less than the sum of the two volumes. Consequently, the initial addition of the proper percentage of water does not reduce the weight of nitrogen by a corresponding percentage.

In general, as little water should be added initially as possible so as not to reduce the amount of nitrogen in the cargo unduly, but enough should be added to provide a sufficient safety factor so that the subsequent heat of formation and solution can be absorbed in order that the ammonia can be pumped at full speed from the vessel to the storage tank without boiling.

In the drawings forming a part of this application, and in which like parts are designated by like reference numerals throughout the same, FIG. 1 is a schematic illustration of a vessel being loaded with ammonia in accordance with the method of the present invention;

FIG. 2 is a schematic illustration of the vessel of FIG. 1 being unloaded in accordance with the method of the present invention.

In the conversion of anhydrous ammonia to 20% N aqua ammonia (whether in one or more stages), for every pound of anhydrous ammonia 3.12 pounds of water must be mixed therewith to produce a solution having a composition by weight of 24.3% $NH_3$ or 20% N.

If the anhydrous ammonia is refrigerated to $-28°$ F. and the water is at a 70° F. ambient temperature, the temperature of the resultant solution can be predetermined by means of the principle that the heat content of the anhydrous ammonia plus the heat content of the added water will equal the heat content of the resultant ammonia-water solution, and by reference to standard enthalpy-concentration charts for the ammonia-water system, such as found in "Chemical Process Principles Charts," O. A. Houger, K. M. Watson, R. A. Ragatz, 2nd Ed., J. Wiley & Sons, Inc., 1960.

In the above example, anhydrous ammonia at $-28°$ F. has an enthalpy of about 10 B.t.u. per pound, and water at 70° F. has an enthalpy of 38 B.t.u. per pound. Thus, if one pound of anhydrous ammonia (at $-28°$ F.) and 3.12 pounds of water (at 70° F.) are mixed together without loss of heat, the heat content of the resultant 4.12 pounds of 20% N aqua ammonia will equal $(1 \times 10) + (3.12 \times 38)$ or 128.5 B.t.u., or, such aqua ammonia will have an enthalpy of 31 B.t.u. per pound. This represents a temperature, at atmospheric pressure, of about 120° F. Since the vapor pressure of 20% N aqua ammonia is one atmosphere at about 110° F., the resultant solution will boil unless it is cooled during the formation thereof. To insure against such boiling it has been found desirable not to allow the temperature of the 20% N aqua ammonia to exceed 90° F. At this temperature, 20% N aqua ammonia has an enthalpy of about 1 B.t.u. per pound, and thus, for each pound of 20% N aqua ammonia produced, about 30 B.t.u. would have to be removed by external cooling. Even to convert a relatively small quantity of 16 tons of anhydrous ammonia into 20% N aqua ammonia, by mixing the anhydrous ammonia at $-28°$ F. with water at 70° F., refrigeration equipment would have to be used to remove almost 4 million B.t.u. from the solution so that the temperature of the aqua ammonia does not rise to more than 90° F.

The present invention is based upon the concept of adding sufficient water to the anhydrous ammonia as it is loaded onto the vessel so that the heat content of the solution is sufficiently low as to absorb the heat generated by the addition of water during the unloading so that the temperature of the 20% N aqua ammonia does not exceed 90° F. as it is unloaded.

FIG. 1 illustrates in general the first step of the invention, wherein anhydrous ammonia is pumped from a suitable storage container 10 through line 11 to the tank 12 of the vessel 13. Water, from a source 14, is pumped through line 15 to a conventional mixer 16 connected in line 11. The tank 12 is at atmospheric pressure and conventional apparatus 17 is provided for maintaining the contents of the tank at $-28°$ F.

For the example assumed above, with the contents of the tank 12 refrigerated to $-28°$ F. and a 70° F. ambient temperature of the dockside water at the unloading point, the amount of water needed to be added initially is determined by a trial-and-error approach so that the total heat of the initial water-ammonia solution at $-28°$ F. plus the total heat of the remaining dockside water at 70° F. to be added is approximately the total heat of the resultant 20% N aqua ammonia at 90° F. Let it be assumed that the proper concentration by weight of ammonia in the initial solution is 75.5%, or for each pound of anhydrous ammonia, 0.32 pound of water should be added initially. Since a total of 3.12 pounds of water must be added to each pound of anhydrous ammonia to produce a 20% N concentration of aqua ammonia, 2.80 pounds of water must be added during unloading for each original pound of anhydrous ammonia (or to each 1.32 pounds of the initial solution).

For a 75.5% concentration of $NH_3$ by weight in the initial solution, the enthalpy of such solution at $-28°$ F. is $-77.5$ B.t.u./pound, and the heat of 1.32 pounds of such solution is equal to $-102.2$ B.t.u. The enthalpy of the 70° F. dockside water is 38 B.t.u./pound, and the heat of 2.80 pounds of such water is 106.4 B.t.u. The addition of 1.32 pounds of the initial solution and 2.80 pounds of dockside water will thus result in 4.12 pounds of 20% N aqua ammonia with a heat of 4.2 B.t.u. or an enthalpy of 1.02 B.t.u./pound. This latter figure is substantially the same enthalpy of 20% N aqua ammonia at 90° F. Thus, the initial addition of .32 pound of water to each pound of anhydrous ammonia will produce an initial solution that may be combined with dockside water at 70° F. without the temperature of the final solution going above 90° F., thereby enabling the initial solution to be pumped at full pumping speed from the vessel.

Again, for purposes of illustration, let it be assumed that the vessel has a 1000-gallon tank therein which is to be used to transport the initial ammonia-water solution at a temperature of $-28°$ F. If pure anhydrous ammonia were to be transported therein, the cargo would weight 5700 pounds (anhydrous ammonia having a density of 5.7 pounds per gallon at $-28°$ F.). If however, a 75.5% $NH_3$ solution (having a density of 6.49 pounds per gallon) is to be transported, 4895 pounds (859 gallons) of anhydrous ammonia and 1595 pounds (191.5 gallons) of water would be put into the tank, resulting in a solution of 6490 pounds (1000 gallons) in the tank.

Thus, even though the solution is 24.5% water, the reduction in weight of $NH_3$ is only 14.1% from that which would be carried if anhydrous ammonia were put into the tank.

The initial solution in tank 12 is maintained at a temperature below that in which the vapor pressure of the solution is below one atmosphere and normally at −28° F.

When the vessel 13 reaches its desired port of call, the initial solution in tank 12 is pumped at full speed by the vessel's pump 18 through line 19 to a non-pressurized and unrefrigerated storage tank 20. The source 21 of dockside water is connected through line 22 to a suitable mixer 23, which preferably is carried by the vessel 13, so that the dockside water may be added to and mixed with the initial solution as it is pumped to the storage tank 20.

In the example set forth above, 13,660 pounds (1640 gallons) of water would be added to the 1000 gallons from tank 12, resulting in the production of 20,150 pounds of 20% N aqua ammonia which is pumped to the storage tank 20. This compares with an amount of 23,500 pounds of 20% N aqua ammonia which could have been produced by a conversion of 1000 gallons of anhydrous ammonia to 20% N aqua ammonia if facilities were available at dockside for the conversion of anhydrous to aqua ammonia.

Thus, by the present invention, the expense of costly conversion apparatus at dockside (or carried by the vessel) and the time required for such conversion during unloading is eliminated, with only a reduction (in the above example) of 14.1% in the amount of ammonia transported.

The percentage of reduction in payload of the vessel may be reduced if the temperature of the dockside water is lower than 70° F. Conversely, the percentage of reduction in payload will increase if the dockside water temperature is increased. However, if the dockside water temperature is higher, more time would be required for normal conversion apparatus to dissipate the heat of solution, whereas with the present invention the time for unloading would remain the same, and in fact would be somewhat less, since a lesser amount of additional water would be added at dockside.

The benefits of the invention are even greater if available L.P.G. tankers are used, since the cargo can be refrigerated to −50° F., thus enabling even more heat to be absorbed by the initial solution stored therein with a lesser amount of water added initially.

The following two charts summarize the figures discussed above in connection with transportation tanks refrigerated to −28° and −50° F. and for dockside water temperatures of 60, 70 and 80° F. In each case, the amount of water added initially is calculated as described above so that the heat content of the initial solution and the heat content of the dockside water is substantially equal to the heat content of 20% N aqua ammonia at 90° F., thus enabling the initial solution to be pumped at full speed directly from the vessel to the storage tank and converted to 20% N aqua ammonia during the unloading without the temperature exceeding 90° F., thereby maintaining the vapor pressure of the resultant solution safely below one atmosphere.

CHART I.—1,000-GALLON VESSEL TANK REFRIGERATED TO −28° F.

| | | | |
|---|---|---|---|
| Temperature of dockside water | 60° F | 70° F | 80° F |
| Amount of anhydrous ammonia required to fill tank | 1,000 gal., 5,700 lb | 1,000 gal., 5,700 lb | 1,000 gal., 5,700 lb |
| Percent of ammonia in initial solution | 80.5 | 75.5 | 71.0 |
| Amount of water in initial solution | 148 gal., 1,230 lb | 191.5 gal., 1,595 lb | 232 gal., 1,930 lb |
| Amount of ammonia in initial solution | 893 gal., 5,090 lb | 859 gal., 4,895 lb | 828 gal., 4,720 lb |
| Amount of initial solution | 1,000 gal., 6,320 lb | 1,000 gal., 6,490 lb | 1,000 gal., 6,650 lb |
| Amount of water to be added at dockside to initial solution | 1,760 gal., 14,630 lb | 1,640 gal., 13,660 lb | 1,538 gal., 12,800 lb |
| Total amount of 20% N aqua ammonia produced | 20,950 lb | 20,150 lb | 19,450 lb |
| Percent reduction in nitrogen content of aqua ammonia produced as compared to nitrogen content aqua ammonia which could have been produced from 1,000 gal. of anhydrous ammonia | 10.6 | 14.1 | 17.2 |

CHART II.—1,000-GALLON VESSEL TANK REFRIGERATED TO −50° F.

| | | | |
|---|---|---|---|
| Temperature of dockside water | 60° F | 70° F | 80° F |
| Amount of anhydrous ammonia required to fill tank | 1,000 gal., 5,800 lb | 1,000 gal., 5,800 lb | 1,000 gal., 5,800 lb |
| Percent of ammonia in initial solution | 85.5 | 80.5 | 76.0 |
| Amount of water in initial solution | 109 gal., 910 lb | 150 gal., 1,250 lb | 189 gal., 1,575 lb |
| Amount of ammonia in initial solution | 893 gal., 5,090 lb | 859 gal., 4,895 lb | 828 gal., 4,720 lb |
| Amount of initial solution | 1,000 gal., 6,240 lb | 1,000 gal., 6,400 lb | 1,000 gal., 6,560 lb |
| Amount of water to be added at dockside to initial solution | 1,890 gal., 15,710 lb | 1,785 gal., 14,850 lb | 1,680 gal., 13,990 lb |
| Total amount of 20% N aqua ammonia produced | 21,950 lb | 21,250 lb | 20,550 lb |
| Percent reduction in nitrogen content of aqua ammonia produced as compared to nitrogen content aqua ammonia which could have been produced from 1,000 gal. of anhydrous ammonia | 7.9 | 11.2 | 14.0 |

As is apparent from the above charts, it is desirable to have the dockside water as cool as possible and to transport the initial solution at as low a temperature as possible.

Similar calculations can be made in the event that it is desired to obtain a different final solution, such as 25% N aqua ammonia. Generally speaking, however, if a greater concentration of $NH_3$ in the aqua ammonia is desired, less total water needs to be added to anhydrous ammonia, and less water would have to be added initially, thus increasing the payload of the vessel.

If desired, the proper initial amount of water could be added to the anhydrous ammonia from tank 10 and stored in another tank while awaiting the vessel 13. Then, the initial solution could be pumped directly from such other tank to the vessel 13 without any more water being added thereto.

Also, if desired, aqua ammonia could be used as the source of initial water, instead of the source 14, since aqua ammonia can be cooled to −28° F. without freezing.

Then, the mixing of the anhydrous ammonia, at −28° F., with aqua ammonia at −28° F. and the transfer thereof to the tank 12 in vessel 13, which tank is also maintained at −28° F., would simplify and expedite the mixing and loading of the vessel.

Having thus described my invention, I claim:

1. A process of converting anhydrous ammonia to a final solution of aqua ammonia having a predetermined nitrogen content, comprising:
   (a) mixing anhydrous ammonia and water together to form an initial ammonia-water solution and storing said initial solution in a tank,
   (b) maintaining said initial solution in said tank at a temperature wherein the vapor pressure of said initial solution is less than one atmosphere,
   (c) transferring said initial solution from said tank into a storage container, said container being at ambient temperature and pressure,
   (d) mixing sufficient water with said initial solution as it is transferred from said tank to said container to convert the initial solution to said final solution,
   (e) the amount of water added in step (a) being sufficient so that the total heat content of said initial solution in said tank plus the total heat content of the water added in step (d) is substantially equal to the heat content of the final solution at a temperature wherein the vapor pressure of said final solution is less than one atmosphere.

2. A process as set forth in claim 1, and further including:
   (f) transporting said tank from the location wherein the initial solution is stored therein to another location wherein the initial solution is transferred therefrom.

3. In a process of converting anhydrous ammonia to a final solution of aqua ammonia having a predetermined nitrogen content whereby water of a predetermined temperature is to be added at a remote locality to complete said conversion, the steps of:
   (a) mixing anhydrous ammonia and water together to form an initial ammonia-water solution and storing said initial solution in a tank,
   (b) maintaining said initial solution in said tank at a temperature wherein the vapor pressure of said initial solution is less than one atmosphere,
   (c) the amount of water added in step (a) being sufficient so that the heat content of said initial solution in said tank is substantially equal to (1) the heat content of said final solution at a temperature wherein the vapor pressure of said final solution is lower than one atmosphere less (2) the heat content of said water of a predetermined temperature.

References Cited

UNITED STATES PATENTS 2,901,403   8/1959   Adams et al. _____ 62—48

LLOYD L. KING, Primary Examiner